US008572011B1

(12) United States Patent
Sculley, II (10) Patent No.: US 8,572,011 B1
(45) Date of Patent: Oct. 29, 2013

(54) OUTCOME ESTIMATION MODELS TRAINED USING REGRESSION AND RANKING TECHNIQUES

(75) Inventor: David W. Sculley, II, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 763 days.

(21) Appl. No.: 12/837,890

(22) Filed: Jul. 16, 2010

(51) Int. Cl.
G06N 3/00 (2006.01)

(52) U.S. Cl.
USPC .............................. 706/13; 707/723; 707/749

(58) Field of Classification Search
USPC ..................................... 706/13; 707/723, 749
See application file for complete search history.

(56) References Cited

U.S. PATENT DOCUMENTS

| 7,289,985 B2* | 10/2007 | Zeng et al. ................... 707/749 |
| 7,490,071 B2* | 2/2009 | Milenova et al. ............... 706/45 |
| 7,558,764 B2* | 7/2009 | Abe et al. ........................ 706/14 |
| 8,126,839 B2* | 2/2012 | Chen et al. .................... 707/603 |
| 2008/0183648 A1* | 7/2008 | Goldberg et al. ............... 706/13 |
| 2010/0125570 A1* | 5/2010 | Chapelle et al. .............. 707/722 |

* cited by examiner

*Primary Examiner* — Kakali Chaki
*Assistant Examiner* — Mai T Tran
(74) *Attorney, Agent, or Firm* — Leason Ellis LLP (57) ABSTRACT

Methods, systems, and apparatus, including computer programs encoded on a computer storage medium, for outcome estimation and content item selection. In one aspect, a method includes training an outcome estimation model using both regression prediction quality measures and ranking prediction quality measures. In response to receiving a request for one or more content items; a predicted outcome is computed for each content item in a set of content items, each respective outcome being computed using the outcome estimation model and feature values associated with each respective the content item. Selection scores are computed for the content items using the predicted outcome. In turn, one or more content items are selected for presentation based on the selection scores; and data are provided that cause presentation of the one or more content items at a client device.

22 Claims, 5 Drawing Sheets

OUTCOME ESTIMATION MODELS TRAINED USING REGRESSION AND RANKING TECHNIQUES

BACKGROUND

This specification relates to data processing such as data mining and outcome estimation.

The performance of content items are often tracked by a system that manages the content items. For example, an advertisement server may track the performance of advertisements it serves by recording the number of impressions the advertisement receives, and the number of clicks on the advertisements. Such performance data can be processed to generate predictive models that can predict the performance of the same or similar content items in future situations.

Data mining is one such example process. Data mining is used, for example, to identify feature values that are associated with a data set of content items and that are indicative of a particular result. A feature value is a value that represents a state or measurement of a feature. Feature values are often used to represent characteristics of content items (e.g., advertisements, audio, video, or text). For example, feature values can be values that represent specific colors, animation characteristics, size characteristics, similarity measures, and other features of content items. Feature values can be selected from a specified set of discrete values (e.g., 0 or 1) or feature values can be selected from a continuous range of values (e.g., 0-10). For example, a feature value of 0 (representing "no") or 1 (representing "yes") can be used to specify whether an advertisement is a static advertisement (i.e., is not animated). Similarly, a set of feature values can be used to specify one or more colors (e.g., 00 representing black and 01 representing yellow) that are included in an advertisement.

The identified feature values for the data set and results (e.g., performance data) associated with the data set can be used to create and train a model that predicts future outcomes or results for a content item represented by a data record storing feature values that describe the content item. For example, curve fitting techniques (e.g., regression analysis, logistic regression, etc.) can be used to generate a model that specifies relationships between feature values and outcomes. In turn, the model can be applied to feature values of a data record to obtain an outcome or result based on the feature values of the data record. Data classifiers (e.g., support vector machines) can also be used to classify data into one or more specified data classifications.

The quality of models generated using different modeling techniques is generally judged using different measures of prediction quality (e.g., accuracy measures and/or error measures). For example, regression techniques may use a measure such as Mean Square Error to measure how accurately a regression model is estimating outcome values, while a ranking model (e.g., a support vector machine) that is generated to estimate relative rankings of data records may use a measure such as the area under a receiver operating characteristic (ROC) curve to determine how well the ranking model is estimating relative ranks for data records. These prediction quality measures, however, do not necessarily correlate positively. Thus, a regression model may be judged as having very good prediction quality using the Mean Square Error measure, but may be judged as having less prediction quality using the area under the ROC curve measure.

SUMMARY

In general, one innovative aspect of the subject matter described in this specification can be embodied in methods that include the actions of training an outcome estimation model using both regression error measures and ranking error measures, the regression error measures specifying error measures associated with training outcomes for respective data records, the ranking error measures specifying error measures associated with training outcomes for respective record pairs, each data record being a data record from a data set of data records, and each record pair being a pair of data records from the data set; receiving a request for one or more content items; computing a predicted outcome using the outcome estimation model and feature values associated with the content item in response to the request and for each content item in a set of content items; computing selection scores for the content items using the predicted outcome; selecting one or more content items based on the selection scores; and providing data that cause presentation of the one or more content items at a client device. Other embodiments of this aspect include corresponding systems, apparatus, and computer programs, configured to perform the actions of the methods, encoded on computer storage devices.

These and other embodiments can each optionally include one or more of the following features. Training the outcome estimation model includes initializing feature weights of the outcome estimation model, each feature weight representing a relative importance of a feature value for predicting an outcome; selecting, as training data with which the feature weights are to be updated, one of a data record and a record pair, each data record being associated with a set of feature values and a reference outcome, the data record being selected with a first probability and the record pair being selected with a second probability; updating the feature weights of the outcome estimation model using the selected training data; determining whether a stop condition has been met; in response to determining that the stop condition has not been met, repeating the selecting, the updating, and the determining; and in response to determining that the stop condition has been met, determining that the outcome estimation model is trained.

Selecting one of a data record and a record pair includes generating a semi-random value; selecting the data record in response to the semi-random value being a value that is included in a data record value set; and selecting the record pair in response to the semi-random value being a value that is included in a record pair value set.

Methods can include selecting a record-pair threshold specifying a value that defines the data record value set and the record pair value set. Selecting a record-pair threshold can include initializing the record-pair threshold to a test value for a pre-specified quantity of outcome estimation models; generating a predicted outcome using a data record for the pre-specified quantity of outcome estimation models; computing, for the pre-specified quantity of outcome estimation models, a loss measure using the predicted outcome and a reference outcome for the data record, the loss measure being a value representing a cost of error; and selecting, as a final value for the record-pair threshold, the test value that is associated with a lowest loss measure.

Updating the feature weights of the outcome estimation model includes adjusting the feature weights using a stochastic gradient step that is computed using a learning rate factor, feature values of the training data, the reference outcome for the training data, and current feature weights of the outcome estimation model. Determining whether the stop condition has been met includes determining whether a pre-specified quantity of feature weight updates have occurred.

Selecting a record pair includes selecting, from an index in which data records are indexed according to reference outcome, a first data record that is indexed according to a first outcome; selecting, from the index, a second data record that is indexed according to a second outcome. Updating the feature weights includes computing pair feature values for the record pair, the set of pair features being based on a mathematical difference between feature values for the first data record and feature values for the second data record; computing a pair outcome for the record pair, the pair outcome being based on a mathematical difference between the reference outcome for the first data record and the reference outcome for the second data record; and adjusting the feature weights using a stochastic gradient step that is computed using a learning rate factor, the pair feature values, the pair outcome, and current feature weights of the outcome estimation model.

Receiving a request for content items includes receiving a request for advertisements to be placed in advertisement slots that are ranked according to a prominence measure. Computing a predicted outcome includes computing a click-through likelihood for each eligible advertisement that is available to be provided in response to the request. Computing selection scores includes computing, as a selection score for each eligible advertisement, a result of a function of the click-through likelihood and a bid that is associated with the eligible advertisement. Selecting, using the selection scores, one or more content items includes selecting a quantity of advertisements to service the request, each of the selected advertisements having a selection score that exceed a selection threshold. Providing data that cause presentation of the one or more content items includes providing data that cause presentation of the selected advertisements in the ranked advertisement slots according to the selection scores.

Training the outcome estimation model includes training a non-linear outcome estimation model using a kernel technique. Training the non-linear outcome estimation model includes selecting a set of reference data records from the data set; selecting a data record from the data set; computing relative feature values for the data record, the relative feature values being computed using feature values for the reference data records and feature values for the data record; computing a training outcome using the relative feature values for the data record and the non-linear outcome estimation model; updating feature weights for the non-linear prediction model using the training outcome; selecting a record pair from the data set; computing relative pair values for the record pair, the relative pair values being computed using pair feature values for the record pair and feature values for the set of reference data records; computing a pair outcome using the relative pair values for the record pair and the updated feature weights; and updating the updated feature weights for the non-linear outcome estimation model using the pair outcome. Updating the feature weights includes computing a stochastic gradient step.

In general, another aspect of the subject matter described in this specification can be embodied in methods that include the actions of receiving a request for content items; selecting a set of eligible content items responsive to the request; receiving feature values for each content item in the set of eligible content items; computing, for each content item in the set of eligible content items, an estimated click-through likelihood using the feature values of the content item and an outcome estimation model that has been trained using regression-based training and ranking-based training; computing, for each content item in the set of eligible content items, a selection score for the content item; selecting, from the set of eligible content items, one or more content items having a selection score that exceeds a selection threshold; providing data that cause presentation of the selected one or more content items at a user device.

Particular embodiments of the subject matter described in this specification can be implemented so as to realize one or more of the following advantages. A data processing apparatus can more accurately compute outcome estimations using a model that has been generated using both regression criteria and ranking criteria than using a model that has been generated using only one of the criteria. A data processing apparatus can more quickly generate a model using an indexed data set from which pairs of data records can be selected according to indexing attributes rather than determining every possible pair of data records available.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Outcome estimation is performed using feature values associated with a data record and an outcome estimation model that has been trained by adjusting the model based on regression-based training techniques ("regression-based training") that train the model using ranking-based measures of prediction quality (e.g., accuracy or other measures) and ranking-based training techniques ("ranking-based training") that train the model using ranking-based measures of prediction quality (e.g., accuracy or other measures). The outcome estimation model can be trained using an iterative process that, at each iteration, semi-randomly trains the outcome estimation model using regression-based training with a first likelihood and ranking-based training with a second likelihood. For example, at each iteration, either the regression-based training or the ranking-based training can be semi-randomly selected, where the semi-random selection is constrained by probability constraints that specify probabilities (i.e., first and second likelihoods) with which each of the training techniques is to be selected. The resulting outcome estimation model is trained using both regression-based prediction quality measures and ranking-based prediction quality measures. For example, the outcome estimation model can be adjusted based on an analysis of the regression-based prediction quality measures during iterations in which regression-based training is selected. The outcome estimation model is adjusted based on an analysis of the ranking-based prediction quality measures during iterations in which ranking-based training is selected. Thus, the outcome estimation model will provide outcome estimates that meet minimum prediction quality thresholds using both regression-based prediction quality measures and ranking-based prediction quality measures (each threshold can be different).

In some implementations, the outcome estimation model is a model that estimates a likelihood (e.g., a probability) with which a content item (e.g., an advertisement or search result) will be selected (e.g., clicked) by a user. With respect to advertisements, for example, this estimated likelihood is used to determine whether a particular advertisement will be selected for presentation with a particular web page and to select a relative position at which the advertisement will be presented on the web page.

For example, assume that the outcome estimation model estimates that a particular advertisement will be clicked with a probability of 20%. Using this specified probability and/or other criteria (e.g., a bid associated with the advertisement) the advertisement can be selected for presentation and placement of the advertisement on the web page can also be selected. For example, the advertisement is ranked relative to other advertisements based on a selection score that is computed as function of the estimated click probability and a bid that is associated with the advertisement. In turn, the advertisement is provided for presentation at a particular advertisement position based on this selection score.

The description that follows describes the outcome estimation model as being generated by a modeling apparatus that is part of an advertisement management system that manages advertising services. However, the modeling apparatus can be implemented independent of the advertisement management system and/or with other systems (e.g., a search system) that use expected outcomes that meet prediction quality thresholds using both regression-based prediction quality measures and rank based prediction quality measures.

For example, the outcome estimation model described below can be used to compute selection scores that are used to select search results for presentation in a search results page (e.g., using prior user selection data as a measure of relevancy of a search result to search queries), selection scores that are used to select an order in which to organize e-mails (e.g., based on user selection history and feature values associated with the selected e-mails), or selection scores that are used to recommend products or items (e.g., movies) to a user based on the user's previous star ranking of other products or items.

Figure 1:
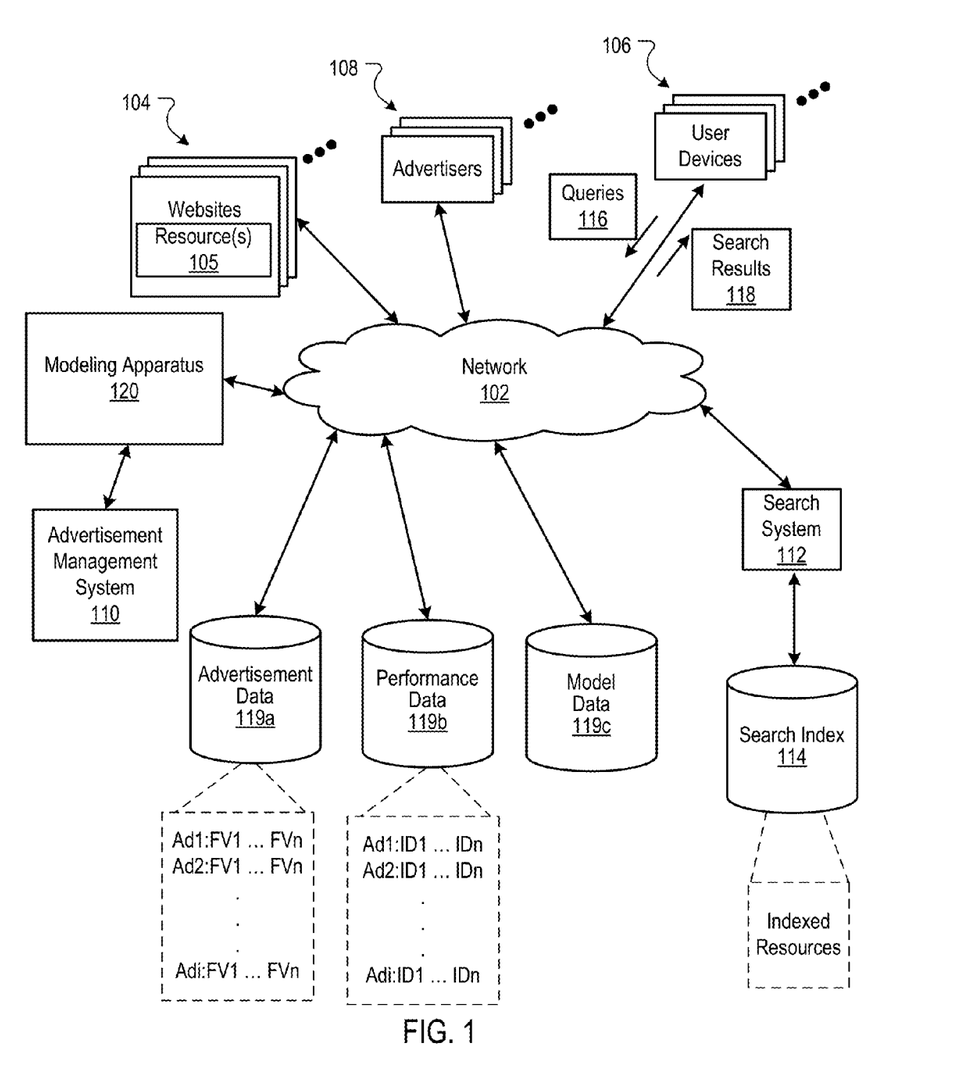
FIG. 1 is a block diagram of an example environment in which an advertisement management system manages advertising services.

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources 105, the environment 100 can include a search system 112 that identifies the resources 105 by crawling and indexing the resources 105 provided by the publishers on the websites 104. Data about the resources can be indexed based on the resource 105 to which the data corresponds. The indexed and, optionally, cached copies of the resources 105 are stored in a search index 114.

User devices 106 can submit search queries 116 to the search system 112 over the network 102. In response, the search system 112 accesses the search index 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results 118 are requested by a user device 106, the advertisement management system 110 receives a request for advertisements to be provided with the resource 105 or search results 118. The request for advertisements can include characteristics of the advertisement slots that are defined for the requested resource or search results page, and can be provided to the advertisement management system 110.

For example, a reference (e.g., URL) to the resource for which the advertisement slot is defined, a size of the advertisement slot, and/or media types that are eligible for presentation in the advertisement slot can be provided to the advertisement management system 110. Similarly, keywords associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 selects advertisements that are eligible to be provided in response to the request ("eligible advertisements"). For example, eligible advertisements can include advertisements having characteristics matching the characteristics of advertisement slots and that are identified as relevant to specified resource keywords or search queries 116. In some implementations, advertisements having targeting keywords that match the resource keywords or the search query 116 are selected as eligible advertisements by the advertisement management system 110.

A targeting keyword can match a resource keyword or a search query 116 by having the same textual content ("text") as the resource keyword or search query 116. The relevance can be based on root stemming, semantic matching, and topic matching. For example, an advertisement associated with the targeting keyword "hockey" can be an eligible advertisement for an advertisement request including the resource keyword "hockey." Similarly, the advertisement can be selected as an eligible advertisement for an advertisement request including the search query "hockey."

A targeting keyword can also match a resource keyword or a search query 116 by having text that is identified as being relevant to a targeting keyword or search query 116 despite having different text than the targeting keyword. For example, an advertisement having the targeting keyword "hockey" may also be selected as an eligible advertisement for an advertisement request including a resource keyword or search query for "sports" because hockey is a type of sport, and therefore, is likely to be relevant to the term "sports."

Targeting keywords and other data associated with the distribution of advertisements can be stored in an advertising data store 119a. The advertising data store 119a is a data store that stores data representing the advertisements, such as an advertisement identifier (e.g., Ad1 ... Adi) and feature values (FV1 ... FVn) that are associated with each respective advertisement. The advertising data store can also store associations between advertisements, advertising campaign parameters that are used to control distribution of the advertisements. For example, the advertising data store 119 can store targeting keywords, bids, and other criteria with which each respective advertisement can be selected for presentation.

Data representing conditions under which advertisements were selected for presentation to a user, and user interaction data (Id1 ... Idn) representing actions taken by users in response to presentation of the advertisement (e.g., Ad1 ... Adi) can be stored in a data store such as performance data store 119b.

For example, the performance data store 119b can store data specifying targeting keywords that caused presentation of the advertisement (e.g., that matched a resource keyword or search query), resource keywords and/or search queries that matched the targeting keywords, ad slots in which the advertisement appeared, characteristics (e.g., locations and sizes) of the ad slots, and any special features that might have been applied to the advertisement. Example features that can be applied to an advertisement include the advertisement being presented with an image, the advertisement being presented with (e.g., adjacent to) multiple links (e.g., hypertext links) to different landing pages for the advertiser, or the advertisement being provided with a link that, in response to selection of the link, causes the advertisement to expand and revealing additional information associated with the advertisement (e.g., revealing a map, presenting a video clip, or providing product purchasing information).

The performance data store 119b can also store user interaction data specifying user interactions with presented advertisements (or other content items). For example, when an advertisement is presented to the user, data can be stored in the performance data store 119b representing the advertisement impression.

When a user selects (i.e., clicks) a presented advertisement, selection data is stored in the performance data store 119b representing the user selection of the advertisement. In some implementations, the selection data is stored in response to a request for a web page that is linked to by the advertisement. For example, the user selection of the advertisement can initiate a request for presentation of a web page that is provided by (or for) the advertiser. The request can include data identifying the particular cookie for the user device, and this data can be stored in the performance data store 119b. Likewise, data indicating that an advertisement was not selected when it was presented can also be stored in the performance data store 119b.

The advertisement management system 110 typically selects the advertisements that are provided for presentation in advertisement slots of a resource or search results page based on results of an auction. For example, the advertisement management system 110 can receive bids for advertisements and allocate the advertisement slots to the advertisements with the highest selection scores at the conclusion of the auction. The bids are amounts (e.g., maximum prices) that the advertisers will pay for presentation (or selection) of their advertisement with a resource or search results page. For example, a bid can specify an amount that an advertiser will to pay for each 1000 impressions (i.e., presentations) of the advertisement, referred to as a CPM bid. Alternatively, the bid can specify an amount that the advertiser is will pay for user selection (i.e., a click-through) of the advertisement or a "conversion" (e.g., when a user performs a particular action related to an advertisement provided with a resource or search results page) following selection of the advertisement.

The auction winners are determined based on the selection scores. A selection score is a value based, in part, on a bid and from which advertisements are selected for presentation. Each selection score can represent a bid value, or a product (or another function) of the bid value and one or more factors. In some implementations, the selection score is a product of the bid specified by the advertiser and an estimated click-through likelihood (eCTL) associated with the advertisement, which can also be referred to as an estimated click-through rate.

For example, assume that advertiser A selects a $1.00 cost per click bid ("CPC" bid) and advertiser A's advertisement is associated with an eCTL of 0.5, while advertiser B selects a $0.80 CPC bid and advertiser B's advertisement is associated with an eCTL of 0.9. In this example, Advertiser A will have a selection score of 0.5, while advertiser B will have an auction score of 0.72. Thus, advertiser B will be the auction winner in this example, even though advertiser A submitted the higher CPC bid.

When the selection score is defined to be a product of a bid and an eCTL that are associated with an advertisement, the advertisement that is associated with a higher eCTL will be selected for presentation ahead of the advertisement that is associated with a lower eCTL, assuming that the two advertisements are associated with a same bid. Similarly, if two advertisements have the same eCTL, the advertisement that is associated with a higher bid will be selected for presentation over the advertisement that is associated with the lower bid.

An eCTL is a value that specifies a likelihood (e.g., a probability) that an advertisement (or another content item) is selected by a user in response to a particular presentation of the advertisement (or other content item). For example, an eCTL of 0.30 for a particular advertisement can specify that there is a 30% likelihood that the particular advertisement will be selected by a user if presented.

The likelihood that a content item will be selected by a user is computed using an outcome estimation model. An outcome estimation model is a model with which an eCTL value is computed for a content item using, at least in part, feature values describing the features of the content item. The feature values used to compute an eCTL can include, for example, values specifying content item color, size, whether the content item is animated, and other aspects of the content item's appearance as well as targeting criteria (e.g., targeting keywords, demographic targeting criteria, and/or geographic targeting criteria) for the content item and measures of similarity between the feature values of the content item and selection criteria specified in a request for content items (e.g., a cosine similarity measure of match between a targeting keyword and a search query). The feature values for each content item can be represented in a data record as a vector of values, where each value of the vector specifies a value for a particular feature.

The outcome estimation model can be a vector of feature weights, where each feature weight is a value representing a relative importance of the feature value for predicting an outcome (e.g., an eCTL). In some implementations, a higher feature weight is indicative of a feature for which the value is more important for determining an eCTL than a feature that is associated with a lower feature weight. For example, a feature associated with a feature weight of 0.6 may be considered more important than a feature that is associated with a feature weight of 0.3. In some implementations, the estimated outcome (e.g., eCTL) is computed as a dot product of the vector of feature weights for the outcome estimation model and the vector of feature values that represent the content item. In other implementations, the estimated outcome can be another function of the feature weights and the feature values.

Outcome estimation models can be stored, for example, in a model data store 119c for use by the advertisement management system 110 and/or another data processing apparatus. When a request for advertisements (or other content items) is received by the advertisement management system 110, the advertisement management system 110 can identify selection criteria (e.g., a search query, resource keyword, size restrictions, and other criteria). Using the selection criteria, the advertisement management system 110 selects a set of eligible advertisements that are responsive to the request. In turn, the advertisement management system 110 obtains an eCTL that is computed using an outcome estimation model for each of the eligible advertisements.

In some implementations, the advertisement management system 110 provides advertisement identifiers specifying the eligible advertisements to a data processing apparatus that computes eCTL values for the eligible advertisements. Using the advertisement identifiers, the data processing apparatus retrieves feature values for each of the eligible advertisements (e.g., from the advertising data store 119a), computes the eCTL for each advertisement using the feature values and an outcome estimation model, and provides the eCTL values to the advertisement management system 110. In other implementations, the advertisement management system 110 inputs the feature values of the eligible advertisements into the outcome estimation model and receives, as output, an eCTL for each of the advertisements.

The environment 100 includes a modeling apparatus 120 that facilitates creation (i.e., training) of outcome estimation models. Outcome estimation models are created through an iterative process by which an initial model is applied to data records (or data record pairs) from a data set to compute outcomes (i.e., results) for the data records. Data records represent characteristics associated with actual outcomes. For example, each data record can include data that represent visual characteristics of an advertisement (i.e., feature values), a presentation position of the advertisement for a particular presentation, and also include user interaction data (e.g., ID1) specifying whether the advertisements were clicked by a user (i.e., the outcome) in response to the particular presentation.

Outcomes that are predicted by an outcome estimation model are compared to the actual outcomes (i.e., data specifying whether an advertisement was clicked by a user) that are associated with the data records, and a measure of error (e.g., a loss measure) is computed and used to adjust the initial model. The adjusted model is then used to compute outcomes for additional data records (or data record pairs), and the model is again adjusted based on measures of error. The training process iteratively continues until a stop condition (e.g., a pre-specified quantity of iterations) is met.

Outcome estimation models are generally created using a single modeling technique. For example, a particular outcome estimation model can be created using either regression-based training, classification-based training, or ranking-based training. However, when only a single training technique is used to create (i.e., train) an outcome estimation model, it is possible that the outcome computed by the outcome estimation model meets a minimum prediction quality threshold for the training technique that was used to create the model, but does not meet minimum prediction quality thresholds for other training techniques. For example, when ranking training techniques alone are used to generate a ranking model, the ranking model can be trained to compute values that increase the likelihood that data records are more accurately ranked (relative to other data records) using values output by the ranking model, but the absolute values output by the ranking model may not be as accurate when measured according to regression-based measures of prediction quality, which emphasize how close the estimated value is to an actual observed value (i.e., a reference outcome).

The modeling apparatus 120 is a data processing apparatus that creates an outcome estimation model using two or more training techniques. In some implementations, the modeling apparatus 120 is configured to use both regression-based training and ranking-based training. In these implementations, the modeling apparatus 120 determines, for each iteration of the training process, whether to use regression-based training or ranking-based training to train the model. For example, at each iteration, the modeling apparatus 120 can semi-randomly select one of the ranking-based training or the regression-based training to train the model. In turn, the modeling apparatus trains the model using the selected training method, as described in more detail with reference to FIG. 2. Using this iterative process, both regression measures of prediction quality and ranking measures of prediction quality are used to adjust feature weights of the model. Thus, the resulting model will be trained to provide estimated outcomes that meet minimum regression prediction quality thresholds and minimum ranking prediction quality thresholds.

Figure 2:
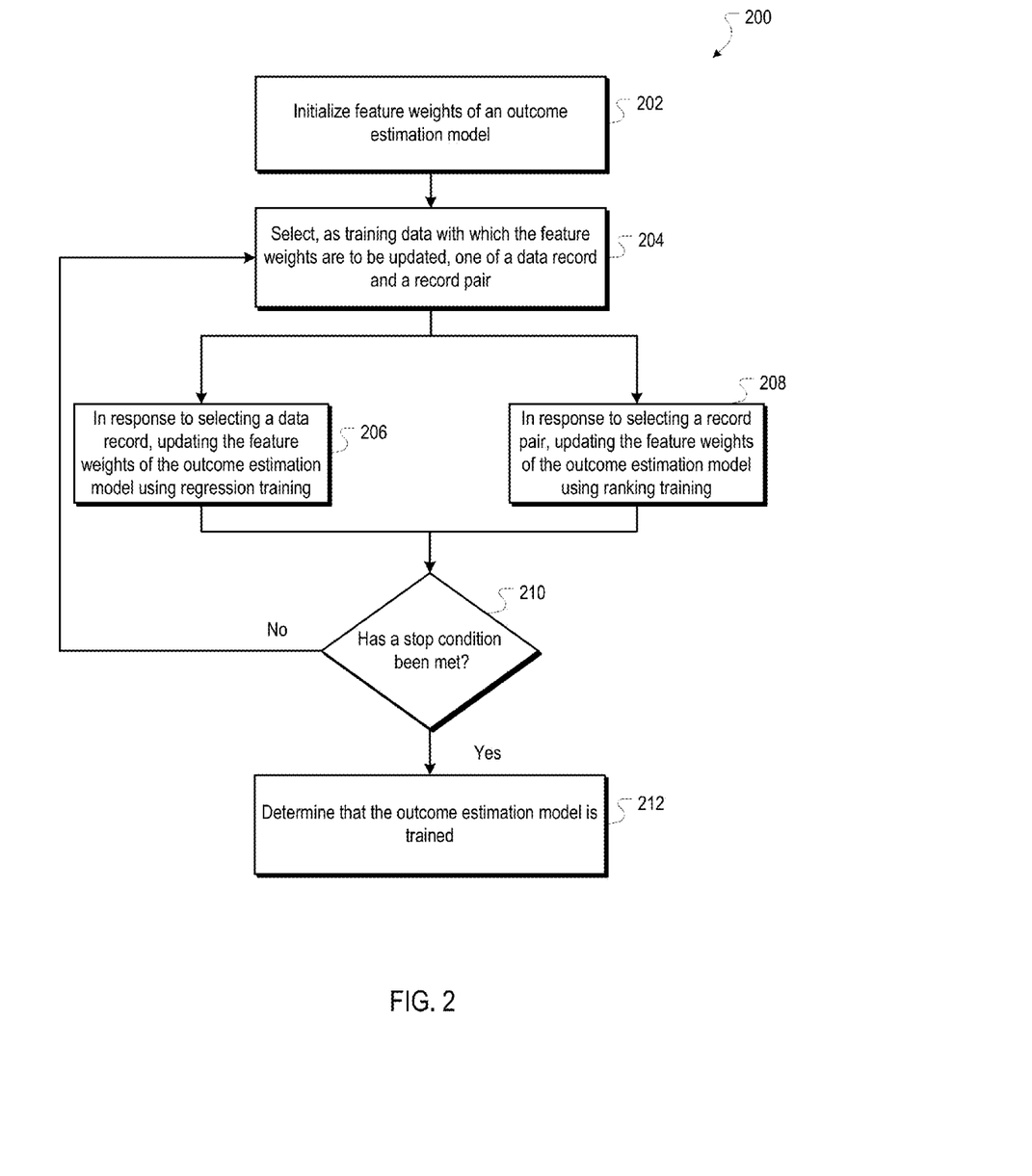
FIG. 2 is an example process for training an outcome estimation model using both regression-based training and ranking-based training.

FIG. 2 is an example process 200 for training an outcome estimation model using both regression-based training and ranking-based training. The process 200 is a process by which feature weights of an outcome estimation model are initialized and one of a data record or a record pair is selected as training data. In response to selecting a data record, the feature values of the outcome estimation model are updated using regression training. In response to selecting a record pair, the feature weights of the outcome estimation model are updated using ranking training. Once the feature weights have been updated, a determination is made whether a stop condition has met. If the stop condition has not been met, the process 200 iteratively continues until the stop condition is met. Once the stop condition is met, the outcome estimation model is considered trained.

The process 200 is described below with reference training an outcome estimation model that estimates an eCTL value for advertisements that are distributed in an online environment. The process 200 can also be used to train an outcome estimation model to estimate other values for other content items (e.g., video, audio, game, or other content items), where the accuracy of absolute and relative values of the outcome are important. The process 200 can be implemented, for example, using the modeling apparatus 120 and/or advertisement management system 110 of FIG. 1. The process 200 can also be implemented as instructions stored on computer storage medium such that execution of the instructions by data processing apparatus cause the data processing apparatus to perform the operations of the process 200.

Feature weights for an outcome estimation model are initialized (202). As described above, an outcome estimation model can be implemented as a vector of feature weights where each feature weight represents a relative importance of a feature for estimating an outcome. In some implementations, the feature weights are initialized by setting the feature weights to default values. Each feature weight can be set to a same default value (e.g., 1.0), or the default value for each feature weight can be independently set.

One of a data record or a record pair is selected as training data with which the feature weights of the outcome estimation model are to be updated (204). In some implementations, selection of either a data record or a record pair is performed on a semi-random basis. For example, a semi-random number can be received from a random number generator. In turn, the semi-random number can be compared to a data record value set and/or a record pair value set, and one of the data record or the record pair can be selected based on the comparison. Alternatively, the semi-random number can be compared to a threshold value and a data record can selected when the semi-random number is less than the threshold value, while a record pair can be selected when the semi-random number is greater than the threshold value.

A data record value set is a set of values that are associated with selection of a data record. For example, when the semi-random number has a value that is included in the data record value set, a data record can be selected from the set of data records. The record pair value set is set of values that are associated with selection of a record pair. For example, when the semi-random number has a value that is included in the record pair value set, a record pair can be selected from the set of data records.

In some implementations, the data record value set and the record pair value set are defined by a threshold value (i.e., a record-pair threshold). The threshold value can selected to impose a probability constraint on the semi-random selection of the data record and the record pair. For example, assume that the random number generator generates values between 1 and 10. In this example, if the threshold value is selected to be 5.1, when the semi-random number is an integer between 1 and 5, a record pair can be selected and when the semi-random number is an integer between 6 and 10, an individual data record can be selected. Thus, selecting a threshold value of 5.1 imposes a probability constraint that each of the record pair and the data record be selected with a 50% probability.

The probability constraint can be adjusted by adjusting the threshold value. For example, if the threshold value is set to 6.1, a record pair will be selected with a 60% probability, while a data record will be selected with a 40% probability.

In some implementations, the threshold value can be set equal to (or computed based on) a value that provides a minimum aggregate error (i.e., a minimum aggregate loss measure) for models. For example, the threshold value can be a value a that minimizes the aggregate loss as computed according to relationship (1), where the aggregate loss is a loss measure that is aggregated over a plurality of models. A loss measure is a value representing a cost per unit error:

$$\text{Aggregate Loss} = \sum_{w_1 - w_i} \alpha L(w, D) + (1 + \alpha)L(w, P) + \frac{\lambda}{2}\|w\|_2^2 \quad (1)$$

where, $\alpha$ is the threshold value;

$L(w,D)$ is a measure of regression loss for the model (w) using a data record (D) as the input;

$L(w,P)$ is a measure of ranking loss for the model (w) using a record pair (P) as the input;

$\lambda$ is constant that limits training aggressiveness (i.e., a magnitude of model adjustment for each iteration of training); and $\|w\|_2^2$ is the Euclidean norm of the model.

The measure of regression loss $L(w,D)$ can be computed, for example, using a squared loss measure such as that specified by relationship (2).

$$l(y_r, y_c) = (y_r - y_c)^2 \quad (2)$$

where $y_c$ is an estimated outcome value computed using the model (w) and feature values of the data record (D); and $y_r$ is the actual value associated with the data record.

The measure of ranking loss $L(w,P)$ can be computed, for example, using a logistic loss measure such as that specified by relationship (3).

$$l(p_r, p_c) = p_r \log(p_c) + (1 - p_r)\log(1 - p_c) \quad (3)$$

where, $p_c$ is an estimated pair outcome value computed using pair feature values for a record pair (e.g., a mathematical difference between feature values for two data records); and $p_a$ is pair outcome value associated with the record pair (P) (e.g., a mathematical difference between two reference outcome values ($y_{r1}, y_{r2}$) that are respectively associated with the data records ($D_1, D_2$) of the record pair).

A value that minimizes the aggregate loss of relationship (1) can be selected, for example, by selecting a pre-specified quantity of models (e.g., 10 models) and a set of test threshold values (e.g., 10 test values). Each model/test value pair can be used to compute an aggregate loss according to relationship (1) using a set of data records (i.e., training records). In turn, the test value that is associated with a lowest aggregate loss can be selected as the record-pair threshold value $\alpha$. Once the record-pair threshold value $\alpha$ is selected, it can be used to select, for each iteration, whether the model will be trained using a data record (regression training) or a record pair (ranking training).

In some implementations, selection of an individual data record is performed by semi-randomly selecting a data record from an index of data records. The index of data records can be stored, for example in the model data store 119c of FIG. 1. The index of data records can be, for example, an index in which data records are indexed according to reference outcomes (i.e., outcome values) that are associated with the data records. For example, when the data records represent advertisements, the reference outcomes can represent whether the advertisement was selected in response to being presented. A value of 1 can specify that the advertisement was selected in response to being presented, while a value of 0 can specify that the advertisement was not selected in response to being presented. The index of data records is described in more detail below.

Selection of a record pair can be performed by semi-randomly selecting from the index, one data record that is associated with a particular outcome and a second data record that is associated with a different outcome. For example, when the data records represent advertisements, one data record can be semi-randomly selected from the set of data records that are indexed according to a value (e.g., 1) specifying that the advertisement was clicked in response to presentation, while the other data record can be semi-randomly selected from the set of data records that are indexed according to a value (e.g., 0) specifying that the advertisement was not clicked in response to presentation.

In response to selecting a data record, the feature weights are updated using regression training (206). In some implementations, the feature weights are updated by adjusting the feature weights using a stochastic gradient step that is computed using a learning rate factor, feature values of the data record, the reference outcome for the data record, and current feature weights of the outcome estimation model. The actual instantiation of the stochastic gradient step will depend on the loss function used to compute loss associated with the model. For example, when a squared loss function (e.g., relationship (2)), is used to compute loss measures for the model, the stochastic gradient step function used to adjust the feature weights is represented by relationship (4).

$$w_i = (1-\eta_i\lambda)w_{i-1} + \eta_i x(y_r - (w_{i-1}, x)) \quad (4)$$

where, $w_i$ is the model (w) with feature weights that have been updated using a stochastic gradient step function;

$\eta_i$ is a learning rate for the model (e.g., $1/\lambda$, c/c+i, or c, where c is a constant);

$\lambda$ is constant that limits training aggressiveness, as described above;

$w_{i-1}$ is the model (w) as of the end of the previous iteration;

x is a vector of feature values associated with the selected data record; and $y_r$ is the reference outcome associated with the data record (x).

Relationship (4) can be used to adjust feature weights of the outcome estimation model for each iteration in which regression training is used to train the model (i.e., each iteration in which a data record was selected to train the model).

Iterations in which a data record is not selected to train the outcome estimation model, a record pair is selected to train the outcome estimation model. In response to selecting a data pair, the feature weights are updated using ranking training (208).

When a record pair is selected to train the outcome estimation model, pair feature values and a pair outcome are computed for the record pair. Pair feature values are feature values that represent the record pair. In some implementations, the pair feature values are computed as a mathematical (e.g., feature by feature) mathematical difference between the feature values of the data records in the record pair. For example, the pair feature values for a pair of data records representing advertisements can be a mathematical difference between the feature values for a data record represents an advertisement that was clicked in response to presentation and the feature values for a data record that represents an advertisement that was not clicked in response to presentation.

A pair outcome is a value that represents an aggregate outcome for the data records of the record pair. In some implementations, the pair outcome is computed as a mathematical difference between the reference outcomes that are respectively associated with the data records in the record pair. Continuing with the example above, the reference outcome associated with the advertisement that was clicked can have a value of 1.0, while the reference outcome associated with advertisement that was not clicked can have a value of 0.0. In this example, the pair outcome is computed to be 1.0 (i.e., 1.0-0.0) or −1.0 (i.e., 0.0-1.0).

The pair feature values, pair outcome, a learning rate factor, and current feature weights of the outcome estimation model can be used to adjust the model feature weights according to a stochastic gradient step, for example, as represented by relationship (5).

$$w_i = (1-\eta_i\lambda)w_{i-1} + \eta_i x_p\left(y_p - \frac{1}{1+6^{-(w_{i-1}, w_p)}}\right) \quad (5)$$

where, $w_i$ is the model (w) with feature weights that have been updated using a stochastic gradient step function;

$\eta_i$ is a learning rate for the model (e.g., $1/\lambda$, c/c+i, or c, where c is a constant);

$\lambda$ is constant that limits training aggressiveness, as described above;

$w_{i-1}$ is the model (w) as of the end of the previous iteration;

$x_p$ is a vector representing the pair feature values; and $y_p$ is the pair outcome associated with the pair feature values ($x_p$).

Relationship (5) can be used to adjust feature weights of the outcome estimation model for each iteration in which ranking training is used to train the model (i.e., each iteration in which a record pair was selected to train the model).

A determination is made whether a stop condition has been met (210). In some implementations, the stop condition is completion of a pre-specified number of training iterations (i.e., a pre-specified quantity of feature weight updates have been completed). For example, prior to training the model, the stop condition can be set to a value representing completion of N iterations, where N is a finite positive integer. In this example, a counter can be incremented upon completion of each iteration (i.e., each feature weight update) and the stop condition can be determined to be met when the counter has a value of N.

In other implementations, the stop condition is specified as a magnitude of a gradient step with which the model is adjusted. For example, a threshold gradient step magnitude can be specified and when a gradient step used to adjust the model is less than the threshold gradient step, it can be determined that the stop condition has been met.

In response to determining that the stop condition has not been met, one of a data record or a record pair are selected (204), such that the updating (206), and the determining (208) are repeated. In response to determining that the stop condition has been met, a determination is made that the outcome estimation model is trained (212). Trained outcome estimation models can be made available for predicting outcomes. For example, a trained outcome estimation model can be used to compute an eCTL, which can be used to select advertisements for presentation and relative presentation positions for the selected advertisements.

The process 200, as described, can be used to create linear outcome estimation models. However, non-linear outcome estimation models can be created using a process similar to that described above.

Figure 3:
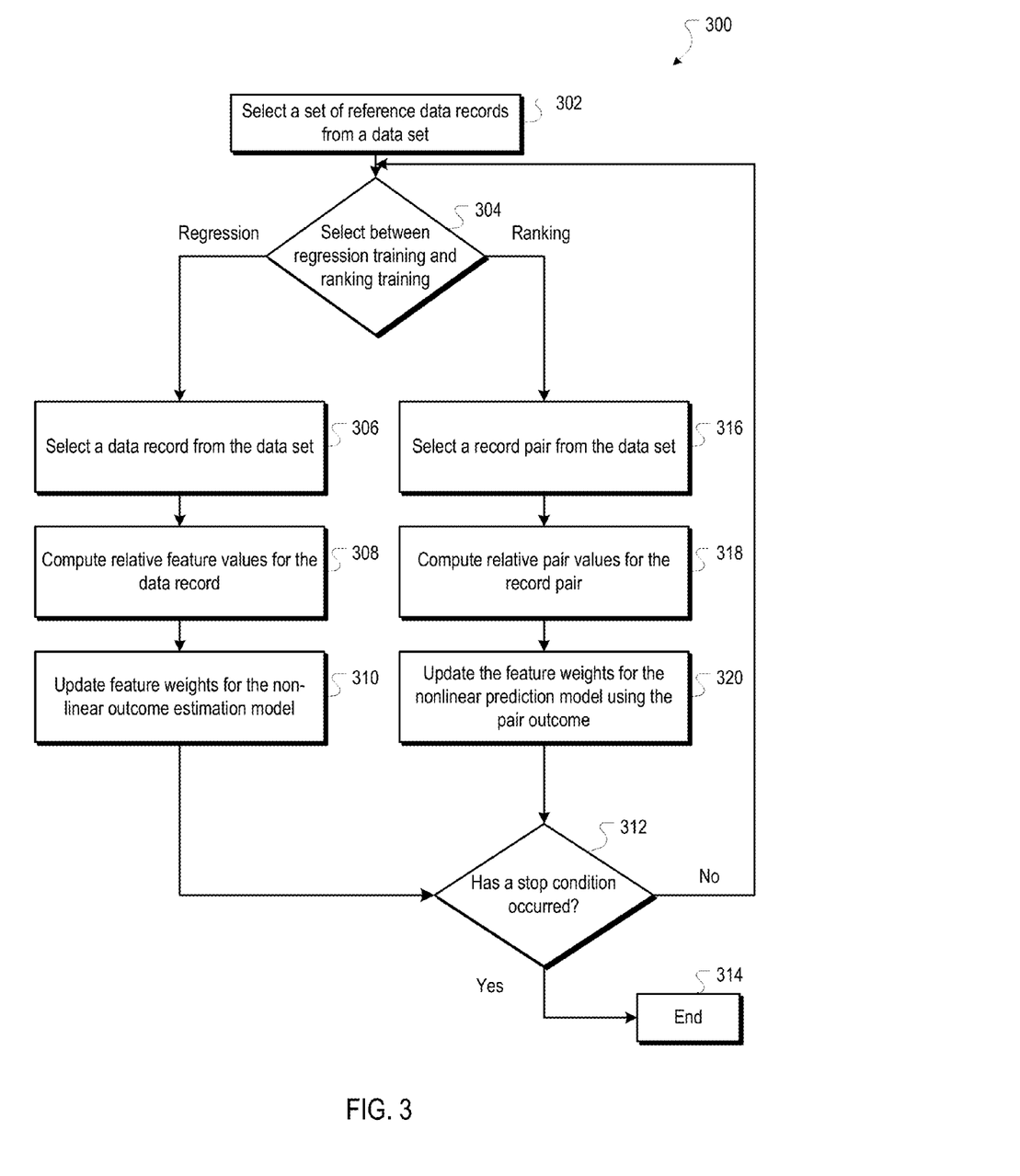
FIG. 3 is an example process for training a non-linear outcome estimation model using both regression-based training and ranking-based training.

FIG. 3 is an example process 300 for training a non-linear outcome estimation model using both regression-based training and ranking-based training. The process 300 is a process by which a set of reference data records are selected from a data set and a selection is made between using regression training or ranking training to update feature weights of an outcome estimation model. When regression training is selected, a data record is selected from the data set, and relative feature values are computed for the data record. In turn, the feature weights are updated based on the training outcome using the relative feature values. When ranking training is selected, a record pair is selected from the data set and relative pair values are computed for the record pair. In turn, the feature weights for the non-linear prediction model are updated using the relative pair values. The process 300 iteratively repeats until a stop condition has occurred (i.e., the stop condition has been met).

The process 300 is described below with reference to selecting advertisements that are distributed in an online environment. The process 300 can also be used to facilitate selection of other content items (e.g., search results, video, audio, game, or other content items). The process 300 can be implemented, for example, using the modeling apparatus 120 and/or advertisement management system 110 of FIG. 1. The process 300 can also be implemented as instructions stored on computer storage medium such that execution of the instructions by data processing apparatus cause the data processing apparatus to perform the operations of the process 300.

A set of reference data records ("reference set") is selected from a data set (302). In some implementations, the reference data records are a representative set of data records from the data set. The reference set can be selected such that the feature values for the reference data records each represent a set of data records in the data set. For example, advertisements that are animated can be represented by one or more data records that are included in the reference set and are associated with an animation feature value of 1.0, while advertisements that are not animated can be represented by one or more data records that are included in the reference set and are associated with an animation feature value of 0.0. The reference data records can be selected so that a uniform distribution of data records represents each feature value and/or combination of feature values.

A selection between regression training and ranking training is made (304). The selection between regression training and ranking training can be made in a manner similar to that described with reference to FIG. 2. For example, a semi-random number can be used to determine whether regression or ranking training will be used for the current training iteration.

In response to a selection of regression training, a data record is selected from the data set (306). The data record can be semi-randomly selected in a manner similar to that described with reference to FIG. 2.

Relative feature values are computed for the data record (308). In some implementations, relative feature values are compute for the data record using the feature values of the selected data record and the feature values for the data records for the reference data records. For example, the selected data record can be separately compared to each of the reference data records and a measure of similarity between the selected data record and the reference data record can be computed. In turn, each measure of similarity can be defined as a relative feature value for the selected data record, such that the relative feature values for the data record are a vector of the measures of similarity.

For example, assume that 100 reference data records are in the set of reference data records. In this example, the data record that is selected at step 306 can be compared to each of the 100 reference data records, and 100 different measures of similarity can be computed based on this comparison. In turn, each of these 100 measures of similarity can be defined as one relative feature value in a vector of 100 relative feature values that represent the data record. This vector of 100 relative feature values can then be used to train the outcome estimation model as described below.

In some implementations, each measure of similarity can be computed as dot a product of the feature value vector for the data record and the feature value vector for a reference data record. In other implementations, each measure of similarity can be a Euclidean distance or a cosine similarity that is computed using the feature values of the selected data record and a reference data record. Using a similarity measure to transform feature values of a data record to relative feature values is one type of a kernel technique that can be used. Other kernel techniques can also be used.

Feature weights for the non-linear outcome estimation model are updated using the relative feature values (310). In some implementations, the feature weights can be updated, for example, using relationship (4) above, by using the vector of relative feature values as the vector feature values associated with the selected data record (x).

A determination is made whether a stop condition has occurred (312). The determination can be made in a manner similar to that described above with reference to FIG. 2. For example, the stop condition can be determined to have occurred after a pre-specified quantity of training iterations have completed, or when the magnitude of the feature weight adjustments are less than a pre-specified magnitude.

In response to determining that the stop condition has occurred, the process 300 ends (314). In response to determining that the stop condition has not occurred, another selection between regression training and ranking training is made (304).

In response to selection of ranking training, a record pair is selected from the data set (316). The record pair can be selected in a manner similar to that described with reference to FIG. 2. For example, one data record can be selected from a set of data records that have been indexed according to a click value of 1.0 (i.e., specifying that the advertisement was clicked in response to presentation), while the other data record can be selected from a set of data records that have been indexed according to a click value of 0.0 (i.e., specifying that the advertisement was not clicked in response to presentation).

In some implementations, the data records are also indexed according to a query (or reference keyword) for which the advertisement (or other content item) represented by the data record was provided. For example, assume that a set of 1,000,000 advertisements have been provided for presentation on a search results page in response to the query "soccer," and that 400,000 of these advertisements were clicked by a user, while 600,000 of these advertisements were not clicked by a user. Additionally, assume that 2,000,000 advertisements were provided for presentation in response to the search query "football," with 1,200,000 of these advertisements being clicked, and 800,000 not being clicked. In this example, data records representing the instances that the advertisements that were presented in response to the query "soccer," can be indexed according to the query term "soccer," and the advertisements that were presented in response to the query "football," can be indexed according to the query "football." Additionally, the queries that are indexed according to the term "soccer," can also be indexed according to whether the advertisement was clicked or not clicked by a user (e.g., 400,000 advertisements indexed to "soccer" and click value=1.0). Thus, each data record can be indexed at multiple levels (e.g., based on query value and click values).

Indexing data records at multiple levels facilitates efficient sampling of the set of data records because, rather than computing each available record pair, data records can be semi-randomly selected according to their index values. For example, to select a record pair for the query "football," a data record can be semi-randomly selected from the set of data records indexed to "football:click value=0.0," and another data record can be semi-randomly selected from the set of data records indexed to "football:click value=1.0."

In some implementations, record pairs that are indexed according each particular query are selected in proportion to a number of record pairs that are available for the query. Continuing with the example above, 400,000 record pairs can be selected for the query "soccer" without replacement of selected data records, and 800,000 record pairs can be selected for the query "football" without replacement of selected data records. If record pairs from both the "soccer" and the "football" index are being used to train a model, query pairs from the "soccer" index can be semi-randomly selected with a probability of 0.333 (i.e., 400,000 soccer pairs/1,200,000 total pairs), while query pairs from the "football" index can be semi-randomly selected with a probability of 0.667 (i.e., 800,000 football pairs/1,200,000 total pairs).

In some implementations, indexing and weighting techniques can be used to index advertisements according to an order in which the advertisements were clicked by the user and adjust the value of the click based on the order in which the advertisements were clicked.

For example, assume that a search results page presented in response to the search query "football" included four advertisements, and that three of the advertisements that were sequentially clicked by the user. In this example, each of the advertisements can be indexed according to its click order (e.g., $1^{st}$, $2^{nd}$, or $3^{rd}$) and the values of these clicks can be weighted to specify a significance of the click as a measure of relevance of the advertisement to the query "football."

For example, the value of a first click can have a weight of 1.0, while the value of the second and third clicks can have weights of 0.50, and 0.25 respectively. In this example, the relative weights of the clicks indicate that the first click is assumed to be the most significant click for determining whether can advertisement was relevant to the search query and therefore will contribute more (based on the higher weight) to the training of the model, while subsequent clicks (e.g., the $2^{nd}$ and the $3^{rd}$ clicks) are assumed to be less significant for determining whether the advertisement is relevant to the search query, and therefore will contribute less (based on their respective weights). Assuming that a click is initially represented by value of 1.0 (i.e., a click occurred), the values attributed to the clicks will be 1.0, 0.5, and 0.25 respectively. Weighting clicks in this manner reduces the likelihood that later clicked (e.g., $3^{rd}$ clicked) advertisements over-contribute to the training of the outcome prediction model because the value of their clicks are reduced relative to earlier clicked (i.e., first and second clicked) advertisements.

Once a record pair has been selected, relative pair values are computed for the record pair (318). In some implementations, the relative pair values are computed using pair feature values for the record pair and feature values for the set of reference data records. The pair feature values for the record pair can be computed as described with reference to FIG. 2. For example, the pair feature values can be a vector of values that result from computation of a mathematical difference between the respective feature value vectors for the data records of the record pair.

Once the pair feature values have been computed for the record pair, the relative pair values can be computed in a manner similar to that described with reference to step 308. For example, a measure of similarity can be computed between the pair feature values and the feature values for each reference data record. In turn, a vector of the measures of similarity can be defined as the relative pair values for the record pair.

Feature weights for the non-linear outcome estimation model are updated using the relative pair values (320). In some implementations, the feature weights for the non-linear outcome estimation model are updated by using the vector of relative pair values as the vector representing the pair feature values ($x_p$).

A determination is made whether the stop condition has occurred (312). In response to determining that the stop condition has occurred, the process 300 ends (314). Otherwise, the process 300 iterates until the stop condition has occurred.

Once the model is classified as a valid outcome estimation model (i.e., a stop condition has been met), the outcome estimation model is stored in a data store (e.g., model data store 119c of FIG. 1) from which the outcome estimation model can be accessed and/or used.

Figure 4:
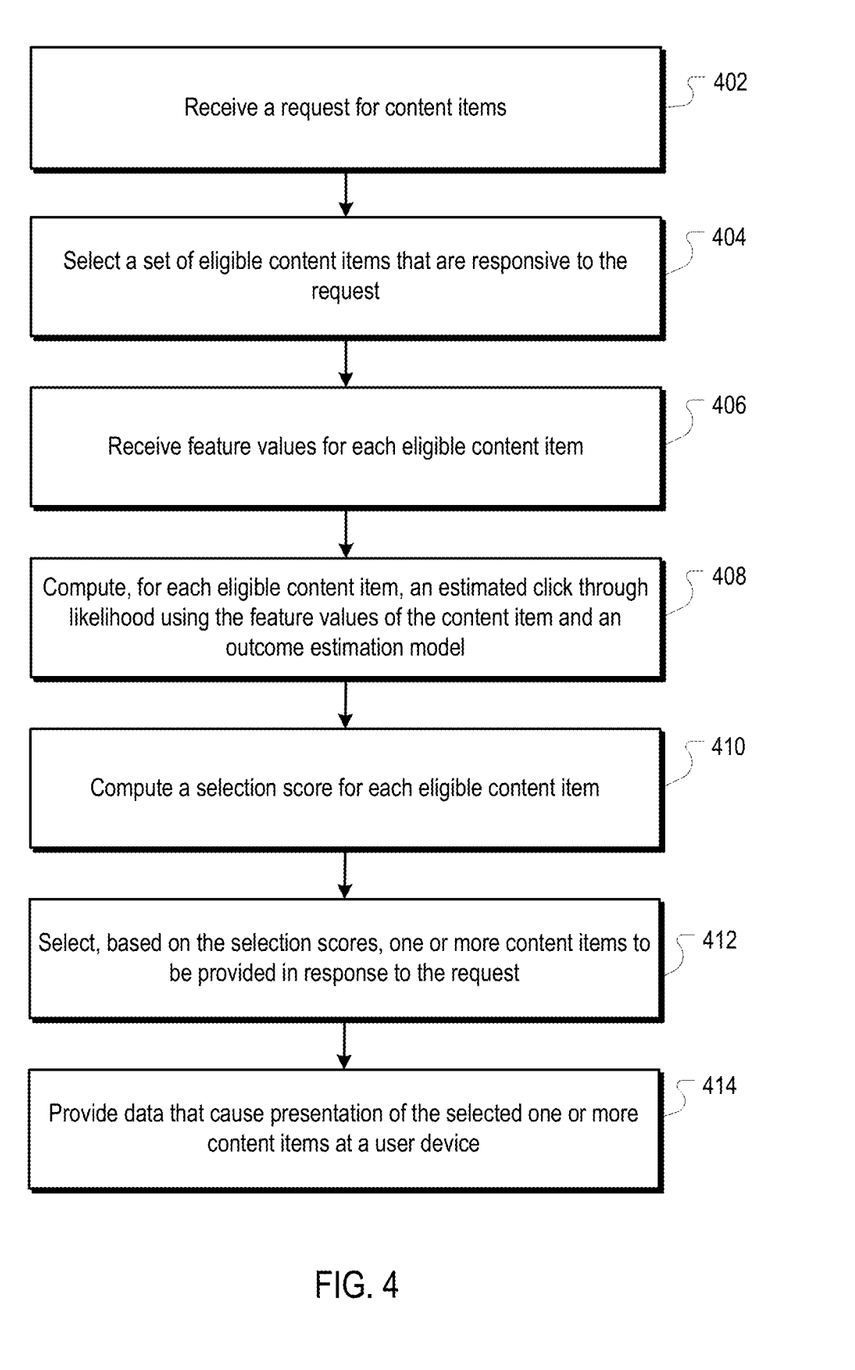
FIG. 4 is a flow chart of an example process for using an outcome estimation model to select content items for presentation in response to a content item request.

FIG. 4 is a flow chart of an example process 400 for using an outcome estimation model to select content items for presentation in response to a content item request. The process 400 is a process by which a request for content items is received and a set of eligible content items responsive to the request is selected. Feature values that are associated with the selected content items are received, and an estimated click-through likelihood (eCTL) is computed for each content item using the feature values that are associated with the content item and an outcome estimation model. A selection score is computed for each content item using the eCTL and one or more of the content items are selected for presentation based on the selection scores. In turn, data are provided that cause presentation of the selected content items at a user device.

The process 400 is described below with reference to selecting advertisements that are distributed in an online environment. The process 400 can also be used to facilitate selection of other content items (e.g., search results, video, audio, game, or other content items). The process 400 can be implemented, for example, using the modeling apparatus 120 and/or advertisement management system 110 of FIG. 1. The process 400 can also be implemented as instructions stored on computer storage medium such that execution of the instructions by data processing apparatus cause the data processing apparatus to perform the operations of the process 400.

A request for content items is received (402). In some implementations, the request for content items is received in response to submission of a search query by a user device. In other implementations, the request for content items is received in response to a request for presentation of a web page at a user device (e.g., selection (or entering) of a URL by a user). The request for content items can include selection criteria that specify attributes to be used for selecting content items responsive to the request. For example, a request can specify one or more of demographics, location, and/or other information about a user that is associated with the user device from which the request was received. Additionally, the request can specify one or more content item restrictions that can be used to specify content items that are restricted from presentation. For example, a content item restriction can specify that content items (e.g., advertisements) associated with competitors of the publisher of the web page with which the content items will be presented are not eligible for presentation with the web page.

A set of eligible content items that are responsive to the request are selected (404). In some implementations, the set of eligible content items includes content items that match (e.g., have at least a minimum pre-specified measure of similarity with) the search query (or resource keyword) associated with the request as well as selection criteria. Additionally, the set of eligible content items can be limited to content items that do not violate the content item restrictions specified by the request.

Feature values for each eligible content item are received (406). The feature values represent characteristics of the content items (e.g., colors, whether the content item is animated, whether the content item includes audio, whether the content item includes video, and/or whether the content item includes a script). In some implementations, the feature values are received from a data store that stores feature values for advertisements, such as the advertising data store 119a of FIG. 1.

An estimated click-through likelihood is computed for each eligible content item using the feature values for the eligible content item and an outcome estimation model (408). In some implementations, the outcome estimation model is trained in a manner similar to that described with reference to FIG. 3 and/or FIG. 4. The outcome estimation model can be required to meet minimum prediction quality threshold using both regression-based prediction quality measures (e.g., squared loss) and ranking-based prediction quality measures (e.g., logistic loss).

A selection score is computed for each eligible content item using the estimated click-through likelihood (410). In some implementations, the selection score for each content item is a function of a bid that is associated with the content item and an eCTL that was computed for the advertisement using the outcome estimation model. For example, the selection score for an advertisement can be a product of a maximum bid that an advertiser will pay for distribution of the advertisement and an eCTL of the advertisement, where the eCTL has been computed using the feature values of the advertisement and the outcome estimation model.

One or more eligible content items are selected, based on the selection scores, to be provided in response to the request (412). The quantity of eligible content items that are selected can be determined based on a number of presentation positions that are available for presenting content items. For example, if three advertisement slots are available for presenting advertisements on a search results page, three advertisements having a highest three selection scores can be selected for presentation with the search results page.

Data that cause presentation of the selected content items at a user device are provided (414). For example, data that cause presentation of the selected content items at a user device for which the request for content items was received can be provided. In some implementations, the data that are provided cause presentation of the content items at specified presentation positions. For example, the data can specify that the content item that is associated with a highest selection score be presented at a most prominent presentation position (e.g., a banner position) and that the content item associated with each next lower selection score be presented at a respective next most prominent presentation position. In some implementations, the prominence of each presentation position can be specified by the publisher and/or computed using normalized selection rates (e.g., click-through-rates) for content items that are presented at each presentation position.

Figure 5:
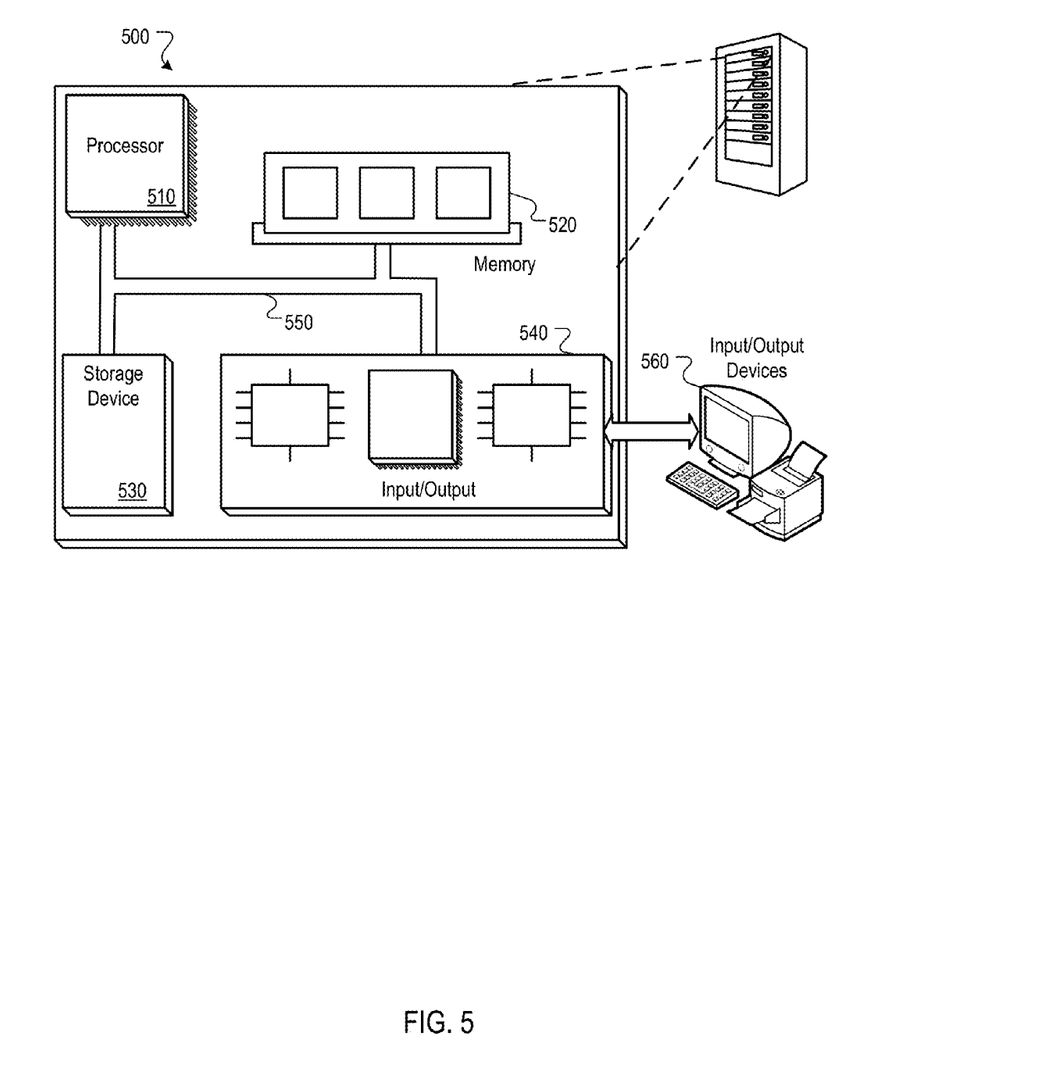
FIG. 5 is block diagram of an example computer system that can be used to train and/or utilize outcome estimation models, as described above.

FIG. 5 is block diagram of an example computer system 500 that can be used to train and/or utilize outcome estimation models, as described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    training an outcome estimation model using both regression error measures and ranking error measures, the regression error measures specifying error measures associated with training outcomes for respective data records, the ranking error measures specifying error measures associated with training outcomes for respective record pairs, each data record being a data record from a data set of data records, and each record pair being a pair of data records from the data set;
    receiving a request for one or more content items;
    in response to the request:
        for each content item in a set of content items, computing a predicted outcome using the outcome estimation model and feature values associated with the content item;
        computing selection scores for the content items using the predicted outcome; and
        selecting one or more content items based on the selection scores; and
        providing data that cause presentation of the one or more content items at a client device,
    wherein training the outcome estimation model comprises:
        initializing feature weights of the outcome estimation model, each feature weight representing a relative importance of a feature value for predicting an outcome;
        selecting, as training data with which the feature weights are to be updated, one of a data record and a record pair, each data record being associated with a set of feature values and a reference outcome, the data record being selected with a first probability and the record pair being selected with a second probability;
        updating the feature weights of the outcome estimation model using the selected training data;
        determining whether a stop condition has been met;
        in response to determining that the stop condition has not been met, repeating the selecting, the updating, and the determining; and
        in response to determining that the stop condition has been met, determining that the outcome estimation model is trained.

2. The method of claim 1, wherein selecting one of a data record and a record pair comprises:
    generating a semi-random value;
    selecting the data record in response to the semi-random value being a value that is included in a data record value set; and
    selecting the record pair in response to the semi-random value being a value that is included in a record pair value set.

3. The method of claim 2, further comprising selecting a record-pair threshold specifying a value that defines the data record value set and the record pair value set.

4. The method of claim 3, wherein selecting a record-pair threshold comprises:
    for a pre-specified quantity of outcome estimation models:
        initializing the record-pair threshold to a test value;
        generating a predicted outcome using a data record;
        computing a loss measure using the predicted outcome and a reference outcome for the data record, the loss measure being a value representing a cost of error; and
        selecting, as a final value for the record-pair threshold, the test value that is associated with a lowest loss measure.

5. The method of claim 1, wherein updating the feature weights of the outcome estimation model comprises adjusting the feature weights using a stochastic gradient step that is computed using a learning rate factor, feature values of the training data, the reference outcome for the training data, and current feature weights of the outcome estimation model.

6. The method of claim 1, wherein determining whether the stop condition has been met comprises determining whether a pre-specified quantity of feature weight updates have occurred.

7. The method of claim 1, wherein selecting a record pair comprises:
    selecting, from an index in which data records are indexed according to reference outcome, a first data record that is indexed according to a first outcome; and
    selecting, from the index, a second data record that is indexed according to a second outcome.

8. The method of claim 7, wherein updating the feature weights comprises:
    computing pair feature values for the record pair, the set of pair features being based on a mathematical difference between feature values for the first data record and feature values for the second data record;
    computing a pair outcome for the record pair, the pair outcome being based on a mathematical difference between the reference outcome for the first data record and the reference outcome for the second data record; and
    adjusting the feature weights using a stochastic gradient step that is computed using a learning rate factor, the pair feature values, the pair outcome, and current feature weights of the outcome estimation model.

9. The method of claim 1, wherein:
    receiving a request for content items comprises receiving a request for advertisements to be placed in advertisement slots that are ranked according to a prominence measure;

computing a predicted outcome comprises computing a click-through likelihood for each eligible advertisement that is available to be provided in response to the request;
computing selection scores comprises computing, as a selection score for each eligible advertisement, a result of a function of the click-through likelihood and a bid that is associated with the eligible advertisement;
selecting, using the selection scores, one or more content items comprises selecting a quantity of advertisements to service the request, each of the selected advertisements having a selection score that exceed a selection threshold; and
providing data that cause presentation of the one or more content items comprises providing data that cause presentation of the selected advertisements in the ranked advertisement slots according to the selection scores.

10. The method of claim 1, wherein training the outcome estimation model comprises training a non-linear outcome estimation model using a kernel technique.

11. The method of claim 10, wherein training the non-linear outcome estimation model comprises:
selecting a set of reference data records from the data set;
selecting a data record from the data set;
computing relative feature values for the data record, the relative feature values being computed using feature values for the reference data records and feature values for the data record;
computing a training outcome using the relative feature values for the data record and the non-linear outcome estimation model;
updating feature weights for the non-linear prediction model using the training outcome;
selecting a record pair from the data set;
computing relative pair values for the record pair, the relative pair values being computed using pair feature values for the record pair and feature values for the set of reference data records;
computing a pair outcome using the relative pair values for the record pair and the updated feature weights; and
updating the updated feature weights for the non-linear outcome estimation model using the pair outcome.

12. The method of claim 11, wherein updating the feature weights comprises computing a stochastic gradient step.

13. A method comprising:
receiving a request for content items;
selecting a set of eligible content items responsive to the request;
for each content item in the set of eligible content items, receiving feature values for the content item;
computing an estimated click-through likelihood using the feature values of the content item and an outcome estimation model that has been trained using regression-based training and ranking-based training; and
computing a selection score for the content item;
selecting, from the set of eligible content items, one or more content items having a selection score that exceeds a selection threshold; and
providing data that cause presentation of the selected one or more content items at a user device,
wherein the outcome estimation model is trained by:
initializing feature weights of the outcome estimation model, each feature weight representing a relative importance of a feature value for predicting an outcome;
selecting, as training data with which the feature weights are to be updated, one of a data record and a record pair, each data record being associated with a set of feature values and a reference outcome, the data record being selected with a first probability and the record pair being selected with a second probability;
updating the feature weights of the outcome estimation model using the selected training data;
determining whether a stop condition has been met;
in response to determining that the stop condition has not been met, repeating the selecting, the updating, and the determining; and
in response to determining that the stop condition has been met, determining that the outcome estimation model is trained.

14. A non-transitory computer storage medium encoded with a computer program, the program comprising instructions that when executed by data processing apparatus cause the data processing apparatus to perform operations comprising:
initializing feature weights of an outcome estimation model of the type that uses both regression error measures and ranking error measures, the regression error measures specifying error measures associated with training outcomes for respective data records, the ranking error measures specifying error measures associated with training outcomes for respective record pairs, each feature weight representing a relative importance of a feature value for predicting an outcome;
selecting, as training data with which the feature weights are to be updated, one of a data record and a record pair, each data record being associated with a set of feature values and a reference outcome, the data record being selected with a first probability and the record pair being selected with a second probability;
updating the feature weights of the outcome estimation model using the selected training data;
determining whether a stop condition has been met;
in response to determining that the stop condition has not been met, repeating the selecting, the updating, and the determining; and
in response to determining that the stop condition has been met, determining that the outcome estimation model is trained.

15. A system comprising:
a data store storing:
data records representing content items, each data record specifying feature values and reference outcomes associated with a particular content item, the feature values for each content item representing characteristics of the content item, each data record being indexed according to the reference outcome that is associated with the content item being represented by the data record, and
respective bids that are respectively associated with each of the content items, each respective bid specifying a maximum amount that will be paid for distribution of the content with which the respective bid is associated; and
a data processing apparatus coupled to the data store, the data processing apparatus comprising one or more computers configured to train an outcome estimation model using the data records, the outcome estimation model having at least a first pre-specified minimum prediction quality measure using regression-based prediction quality measures and at least a second pre-specified minimum prediction quality measure using ranking-based prediction quality measures,
wherein the data processing apparatus is further configured to compute a selection score using an output of the outcome estimation model and select, using the selection score, a set of content items for presentation in response to a request for content items.

16. The system of claim 15, wherein the data processing apparatus is further configured to train the outcome estimation model to compute an estimated click-through likelihood of a content item, wherein the reference outcome is a value specifying whether a content item was clicked by a user in response to presentation of the content item.

17. The system of claim 16, wherein the data processing apparatus is further configured to train, at each training iteration, the outcome estimation model using a single data record with a first probability and using a record pair with a second probability, the record pair being a pair of the data records.

18. The system of claim 17, wherein the data processing apparatus is further configured to adjust feature weights of the outcome estimation model based on a stochastic gradient step that is computed using feature values of the single data record and the reference outcome that is associated with the single data record.

19. The system of claim 18, wherein the data processing apparatus is further configured to adjust the feature weights of the outcome estimation model based on a stochastic gradient step that is compute using pair feature values associated with the record pair.

20. The system of claim 19, wherein the record pair includes a first data record that is associated with a first reference outcome and a second data record that is associated with a second reference outcome, the second reference outcome being different than the first reference outcome.

21. The system of claim 20, wherein the data processing apparatus is further configured to adjust the feature weights based on a stochastic gradient step that is computed using one of relative feature values for a data record and relative pair values for a record pair, the relative feature values representing similarity measures between the feature values for the data record and a set of reference data records, the relative pair values representing similarity measures between the pair feature values for the record pair and the set of reference data records.

22. The system of claim 15, wherein the output of the outcome estimation model is an estimated click-through likelihood that is computed using feature values of an eligible advertisement that is eligible to be presented in response to a request for advertisements.

* * * * *